United States Patent [19]
Bagley et al.

[11] 3,781,188
[45] Dec. 25, 1973

[54] EXPERIMENTAL RESEARCH PULP DIGESTER ASSEMBLY

[75] Inventors: John M. Bagley; John L. Keays, both of Vancouver, British Columbia, Canada

[73] Assignee: Ellett Copper and Brass Company Ltd., Vancouver, Canada

[22] Filed: Feb. 22, 1972

[21] Appl. No.: 228,247

Related U.S. Application Data
[63] Continuation of Ser. No. 888,590, Dec. 29, 1969, abandoned.

[52] U.S. Cl. .................. 162/233, 23/253, 162/49
[51] Int. Cl. .............................................. D21c 7/12
[58] Field of Search .................. 162/49, 198, 238, 162/233; 99/242; 23/253, 259, 292

[56] References Cited
UNITED STATES PATENTS
1,827,658  10/1931  Johnsen ............................ 162/49
3,118,735  1/1964  Favre et al. .................... 23/253 X
3,540,982  11/1970  Sepall .......................... 162/198 X Primary Examiner—Robert L. Lindsay, Jr.
Assistant Examiner—Alfred D'Andrea, Jr.
Attorney—Brian J. Wood

[57] ABSTRACT

Method of processing, digesting, or pulping samples of e.g. a body of wood chips under conditions reproducing experimental or production runs with precision. Samples are processed in sealed cannisters with heat supplied by liquid circulating through each at a constant temperature, processing in any cannister is terminated at a required time within seconds, the contents are cooled, the cannister unsealed and contents tested to determine progress. Apparatus using the method has hot liquid supply to each cannister from a manifold through conduits of equal length so that the temperature in each is the same, valves in conduits and in discharge conduits can be closed, selectively isolating any cannister. Water is introduced to flush and cool. Means are provided to alter the temperature of liquid supplied to a particular cannister.

2 Claims, 3 Drawing Figures

EXPERIMENTAL RESEARCH PULP DIGESTER ASSEMBLY

This a continuation of application Ser. No. 888,590, filed Dec. 29, 1969, now abandoned.

BACKGROUND OF THE INVENTION

1. Field of the Invention

The invention relates to an assembly of apparatus for pulping small quantities of chips, flakes, sawdust, or other comminuted forms of wood under precisely controlled conditions and to a method, exemplification of which is expressed in the apparatus, for precise control of conditions or parameters so that cooks in individual units of the assembly can be isolated at a particular point of time. Thus examination of an isolated cook precisely reflects progress at that time. Method and apparatus according to the invention can be used with materials other than wood, having application to other fields of manufacture.

2. Prior Art

In pulping research, it is common practice to cook or process separate small quantities of wood particles, varying from as little as several grams to several kilograms, at the same time and under the same conditions in order to permit e.g. chemical composition, yield, strength, or other pulp properties of the particles being digested, to be determined during the process of cooking, or to compare various wood species or tree components pulped by the same process, or to study the effect of pulping liquor composition on pulp yield and quality from a given wood species.

Apparatus commonly used includes a plurality of stainless steel containers, commonly called bombs, containing chips or other wood particles together with digestive liquor, depending upon the pulping process under study, which are then sealed and then immersed in a bath of liquid such as oil, glycerine, or ethylene glycol, which can be heated to a high temperature, say up to 200° C. The bath is then brought to a temperature necessary to raise the temperature of the digestive liquor and particles being studied to a predetermined level at a predetermined time.

During the cooking process the bombs are removed at predetermined intervals, or all bombs are removed at the end of the cooking process, cooled, and then opened to permit the contents to be examined.

Prior art research technique for pulping small amounts of material has a number of disadvantages. It is difficult to maintain precise uniform temperature of the heating bath, and consequently of the digestive liquor. The temperature of the bath liquid is not necessarily the same as that of the digestive liquor, as the digestive liquor is heated through the bomb casing from a liquid which is not itself uniform in temperature throughout. The bath liquid is stirred, or circulated, in order to obtain a reasonably uniform temperature throughout. Rocking or rotating the bombs has a deleterious effect on the pulp being produced, particularly with respect to its strength characteristics, and mechanism for rocking or rotating the bombs adds appreciably to cost and complexity of the equipment.

Removal of the bombs from the hot bath liquid is awkward. It can also be hazardous, and is often obnoxious because of fumes.

Cooking time is difficult to duplicate with precision in a series of research tests, because it is difficult to remove the bombs from the bath liquid, and to cool them, on a precise time schedule. Thus tests under apparently the same conditions give differing results.

SUMMARY OF THE INVENTION

The present invention provides research digester apparatus which permits a number of samples to be pulped, digested, or cooked, under closely identical conditions with a degree of precision and reproducability higher than heretofore attained in prior art method and apparatus known to the inventors. Operation is under conditions which can be made closely to simulate those of actual production pulping, and can be used for quality control of production digesters.

Parameters affecting precision are; temperature, time, digestive liquor, sampling error, inherent precision of the method as expressed in the instant apparatus, and parameters not taken into consideration above.

In the method and apparatus all parameters except sampling, and those parameters not taken into consideration, are held constant within limits later particularized. Laboratory procedures can be used to render sampling error minimal, and when this is done residuals express inherent precision of the method and apparatus together with effects of any parameters not considered. When this is done the residuals are negligible, being about one order of magnitude smaller than residuals due to all other parameters when the sampling parameter is not held constant. Hazard is materialy reduced but not eliminated.

A method according to the present invention includes steps of selecting samples of the material and placing a sample in each of a plurality of cannisters in which the samples are digested. The samples, being representative of a body of material being similarly processed, are subject to sampling error as aforesaid. A source of liquid heated to a temperature the same as that at which the body is being processed is provided, and is circulated simultaneously in parallel from a supply source through each cannister, so that each is supplied with liquid at a temperature essentially that of the supply source. After circulation through all of the containers for a particular length of time, one container is isolated from the supply, cooled, and unsealed. The sample is then examined using ordinary test procedures to determine progress of the cook after the particular length of time.

The circulating liquid can be digestive liquor being used in processing of the body, alternatively the sample can be placed in a bomb with a quantity of the digestive liquor, so that the processing of the sample takes place within the bomb in the cannister.

When a bomb is used, the circulating liquid can be the digestive liquor from an experimental digester or from a production digester, or can be a liquid heated to a required temperature suitable liquids being as stated above and including water. As well, temperature of the liquid supplied to at least one cannister can be altered so that the effect of alteration in temperature is reflected in the processing in that cannister in which temperature of the liquid has been altered.

Apparatus expressing the method includes means to connect the source of heated liquid to a conduit leading to an intake manifold. Separate conduit means of equal length extend from the intake manifold to each cannister through a valve, and means are provided extending from each cannister to a discharge manifold, which last mentioned means also includes an associated valve. Thus, liquid within each cannister is at the same temperature, which temperature is essentially that of the supply. Isolation of a particular cannister is effected by closing both valves after processing for the particular time. Means to cool each cannister after isolation are provided by opening a valve from a cold water supply introducing cold water to the cannister, to discharge through a drain also having an associated valve. After cooling the cannister is unsealed, opened, and the cook is examined as aforesaid.

It is seen that, each cannister being relatively small and being cooled before unsealing, inconvenience and hazard above is materially reduced. Means to alter the temperature of the liquid entering at least one cannister include a jacket surrounding an inlet conduit to the cannister, the jacket containing an electrical heating means, and/or means to introduce hot liquid or steam to the jacket, with means to introduce a cool liquid when the temperature is to be lowered. Discharge means are provided so that the steam or liquid discharges from the jacket through a drain.

To minimize temperature drop between the manifolds and the cannisters, lagging is provided wherever a material temperature gradient exists. While the lagging has little effect upon uniformity of temperature as between the individual containers, it provides that the temperature in the cannisters is essentially that of the supply, except where a cannister has a means to alter temperature of the entering liquid.

A detail description following, related to drawings, gives exemplification of embodiment of method according to the invention, and of apparatus expressing the method. The invention is, however, capable of expression in method and means other than described and illustrated.

DETAILED DESCRIPTION

FIGS. 1 AND 2

Figure 1:
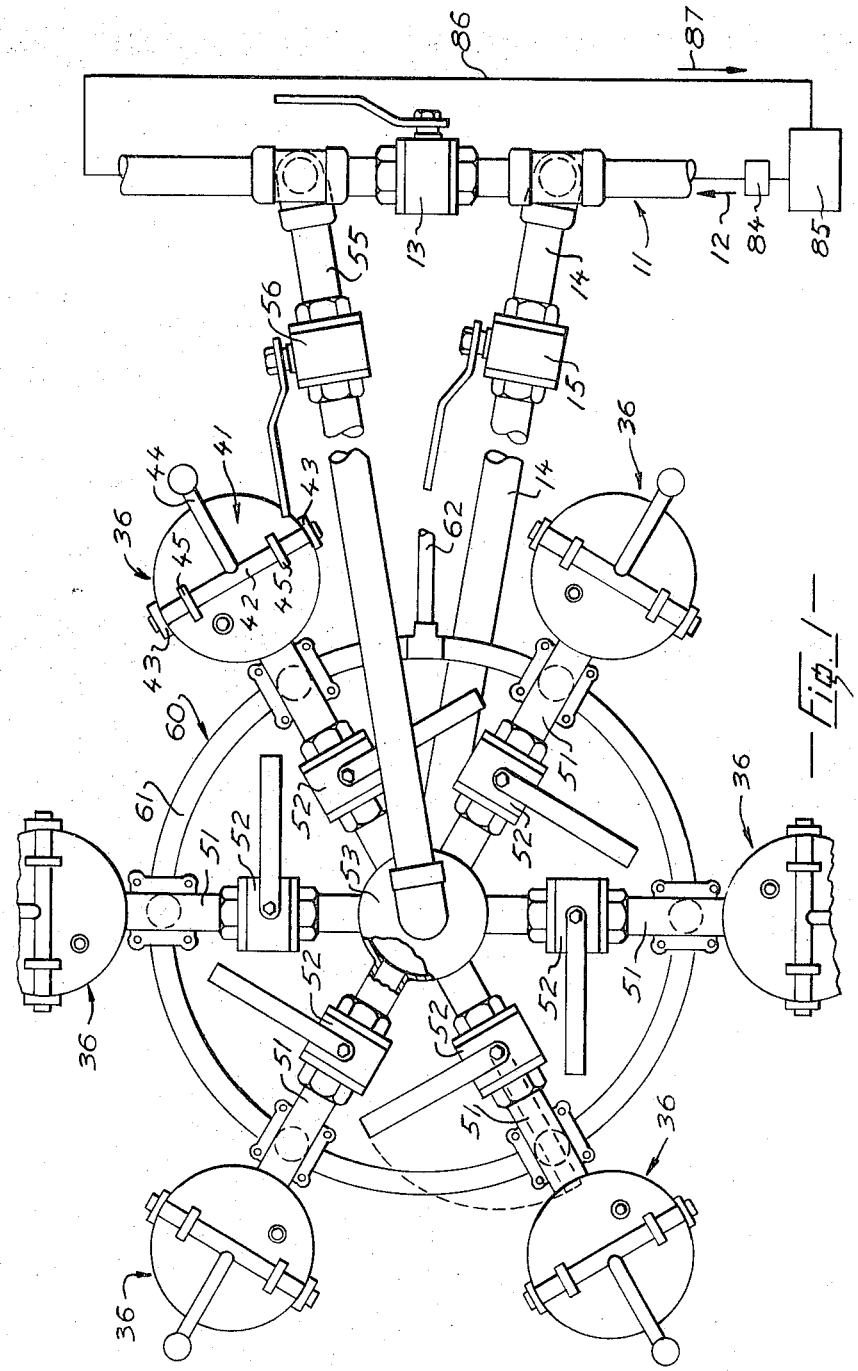
FIG. 1 is a plan of apparatus in accordance with the invention.

Referring to the drawings, a digester apparatus assembly of the invention is designated generally 10 and includes a main circulation conduit 11 adapted for flow of liquid therethrough in a direction indicated by an arrow 12, and having a valve 13. A main intake conduit 14 is connected to the circulation conduit 11 upstream of the valve 13 for directing the liquid through an intake valve 15 into an intake manifold 16 seen in FIG. 2 only.

Figure 2:
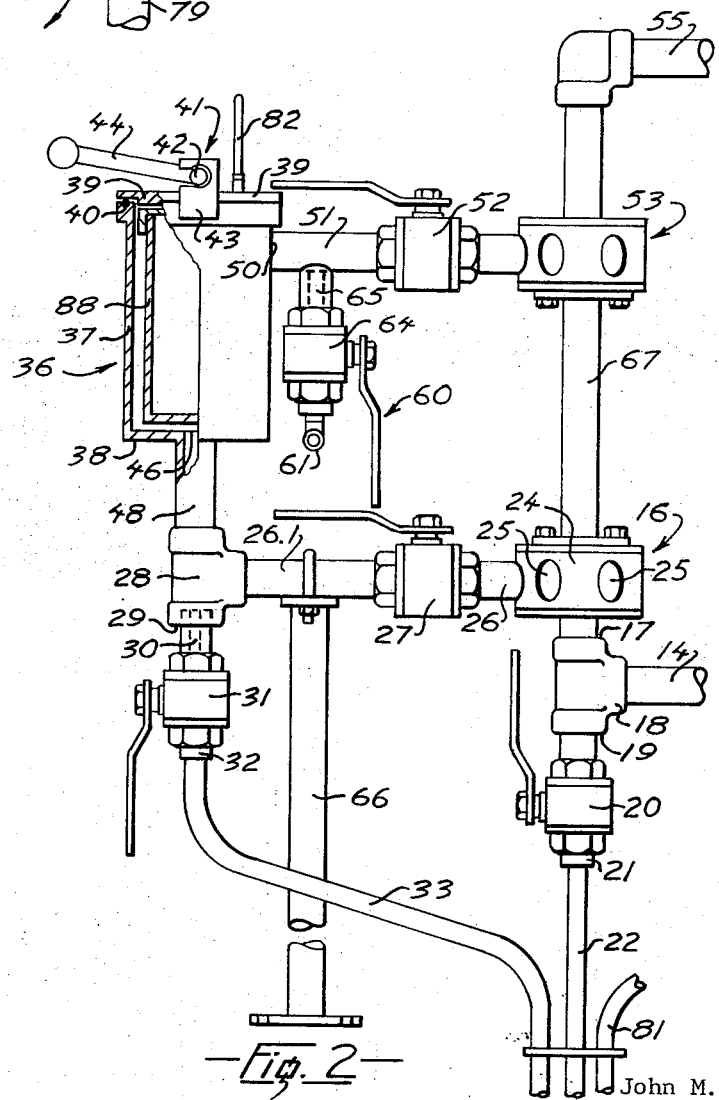
FIG. 2 is a side elevation detail showing one cannister, and conduit connection to a source of heated liquid and to a water flushing source, the digester being partially broken away for clarity of illustration.

As illustrated in FIG. 2, the intake mainfold 16 is connected to the intake conduit 14 through one side 17 of a tee 18. An opposite side 19 of the tee is connected, through a valve 20 and flow reducer 21, to a drain 22.

The manifold 16 is generally cylindrical having a side wall 24 provided with a plurality of discharge ports 25. Radial conduits 26, of which only one is shown in FIG. 2, extend outwards from each discharge port 25 of the manifold. Each of the conduits 26 is provided with an associated valve 27, a radial extension 26.1 extending from the valve to a tee 28. One side 29 of each of the tees 28 is connected through a restricted flow connection 30, a drain valve 31, and a reducer 32, to a second drain 33.

Referring now to FIG. 1, the apparatus 10 also includes a plurality of small cannisters 36 of between 50 and 1,000 cc capacity, one cannister being positioned over each tee 28 as shown.

In FIG. 2 one of the cannisters 36 is seen in detail. Each cannister is made of stainless steel having a side wall 37, a bottom wall 38, and a removable cover 39. The cover of each cannister is pressed into sealing engagement with an O-ring 40 by means of a quick opening locking device 41, providing means releasably to seal and lock each cannister. Each locking device 41, see FIGS. 1 and 2, has a transverse rod 42 engaged in notched brackets 43 extending above and connected to the side wall of each cannister, each rod being provided with a lever 44 and cams 45 (FIG. 1) which are moved by operation of the lever 44 into and out of engagement with the cannister cover.

As seen in FIG. 2, the bottom wall 38 of each cannister has a central intake port 46, to which a conduit 48 to the tee 28 is connected. The side wall 37 of each cannister also has a discharge port 50 just below the cover 39. The discharge port 50 of each cannister is connected, through a discharge conduit 51 and an associated valve 52 to a discharge manifold 53 similar to the intake manifold 16. A main discharge conduit 55 returns liquid from the discharge manifold through, see now FIG. 1, valve 56 to the main conduit 11.

Means are provided to cool and flush each cannister, viz. an individual connection to a cold water flush system 60 which includes a pipe 61 concentric about the discharge manifold 53 and located below the discharge conduits 51. The pipe 61 is connected by an intake pipe 62 to a cold water source (not shown) and has a conduit connection to each discharge conduit 51 upstream of the valves 52 through, see FIG. 2, an associated valve 64 and a restricted flow connected 65. All of the pipes and fittings carrying heated liquid and the cannisters are lagged to reduce heat loss. For convenience of illustration, the lagging has been omitted from the drawings.

The apparatus 10 is supported by stanchions 66 FIG. 2 connected to the radial conduits 26, and the discharge manifold 53 is supported by a stanchion 67 extending upwards from the intake manifold.

EMBODIMENT WITH MEANS TO ALTER CIRCULATING LIQUID TEMPERATURE

FIG. 3

Figure 3:
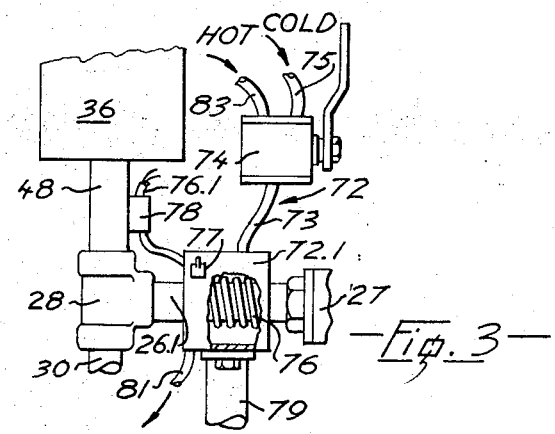
FIG. 3 is a side elevation detail of means to alter temperature of liquid in a conduit supplying a cannister.

Means 72 to alter temperature of liquid entering the cannister 36 can be provided as shown in FIG. 3. An insulated jacket 72.1 is spaced from and surrounds the radial extension 26.1 from the valve 27 to the tee 28. An inlet pipe 73 from a regulator valve 74 admits water from a pipe 75 to the jacket when the valve is open. An electrical heating coil element 76 surrounds the extension 26.1, being energized through a line cable 76.1. A switch 77 and a variable thermostat 78 are in series with the coil across the line, the thermostat being responsive to temperature of the liquid entering the cannister 36 through the conduit 48. A stanchion 79 is provied as shown.

When it is desired to increase temperature of the liquor, the thermostat is set to that temperature, the valve 74 is closed, and the switch 77 is closed energizing the heating element. Temperature of the liquor is thus controlled according to the thermostat setting. To cool, the switch 77 is opened and water at a suitable temperature is introduced through the valve 74 to the jacket, discharging through a drain 81. A thermometer 82 (FIG. 1 only) indicates temperature of the liquid in the cannister 36. The regulating valve 74 can be a standard thermostatically controlled mixing valve generally similar to a shower valve mixing hot water or steam from a pipe 83 with cold water from the pipe 75, so that admission from the pipe 73 can be at any desired temperature in a range between steam or hot water temperature and cold water temperature. When superheated steam at sufficiently high temperature is conveniently available, the heating coil is not necessary. Pressure problems are however avoided with hot and cold water and common thermostatic mixing valve, using the heating coil to achieve higher temperatures.

In the FIG. 3 embodiment, the liquid entering different cannisters can be at different temperatures. For example, in a six-unit assembly, the liquid enters the inlet distributor 16 at 170° C; the circulating liquid entering two of the cannisters is cooled to 168° C, the liquid in two other is heated to 172° C, and the liquid in the remaining two cannister units remains at 170° C. The liquid leaving the outlet distributor is at 170° C. The liquid leaving the outlet distributor is at 170° C, minus a small temperature drop as is later explained. This embodiment permits variation in temperature parameter with other parameters remaining unchanged.

PARAMETERS

TEMPERATURE

Referring to FIG. 2, a typical initial supply temperature $T_i$ in the main intake 14 might be 172° C. Since ambient temperature is 20° C or 25° C temperature in the discharge manifold is necessarily lower by an amount $\Delta T$ if heat is not supplied, for instance by means illustrated in FIG. 3.

Means to maintain uniformity of temperature amongst the cannisters include circulation of liquid through each cannister from conduits of equal length — conveniently these conduits are radial as shown — supplies from the intake manifold 16, it is desirable that $\Delta T$ be minimal. With obvious lagging as aforesaid, $\Delta T$ can be reduced to about 1° C and, from symmetry, cannister temperature is $T_i - \Delta T/2$, that is cannister temperature is but 0.5° C lower than T, temperature in each cannister being the same within close limits since each cannister is connected to the intake and discharge manifolds through conduits of equal length as aforesaid, and because other losses will be closely equal.

It is then seen that apparatus according to FIGS. 1 and 2 achieves that cannister temperature is sensibly that of the supply within about half a degree, and that individual cannisters differ in temperature by amounts that are small and, for the instant purposes, can be neglected.

TIME

It has been shown that an individual cannister can be isolated within seconds, consequently the cook can be terminated and cooled at any desired time, within seconds.

DIGESTIVE LIQUOR

Since digestive liquor actually used in an experimental digester or from a production digester, is used to effect digestion in both modes of operation below described, this parameter is the same in all cannisters.

SAMPLING ERROR

When the material placed in the cannisters is taken from a body of screened chips being used in production, variation is to be expected from differences between individual samples since ordinarily such a body is not homogeneous.

OPERATION

In operation, in for instance digesting wood particles, a sample from a body of particulate material is placed in each cannister and a heated liquid is circulated through the cannisters, the liquid in each cannister being at the same temperature — within limits closer than are significant. After digesting has proceeded for a particular length of time, one cannister is isolated and its contents examined.

Digestion requires exposure to heat and to a digestive liquor. In a first mode of operation the circulating liquid is a hot digestive liquor, in a second mode the digestive liquor and the sample are placed in a bomb, the circulating liquid being one of a group particularized above, or obtained from an experimental digester, or obtained from a production digester.

FIRST MODE

In the first mode of operation a basket, not shown, containing a sample of wood particles to be digested is placed in each of the cannisters. The main circulation conduit 11, see FIG. 1, is connected through a circulation pump 84 to an experimental digester 85. A digester intake conduit 86 is connected to the main intake conduit 11 upstream of the valve 13, the pump 84, digester 85 and connections being shown diagrammetrically in FIG. 1 and not to scale. The digester has a relatively large capacity, say between 20 and 300 liters. The wood particles are processed, i.e. cooked, in the digester under controlled temperature in a selected digestive liquor. The valve 13 is closed and the valves 15, 56, opened so that liquor from the experimental digester 84 flows into the intake manifold and through conduits 26 into and upwards through each of the cannisters (the drain valve 31 being closed) the liquor being discharged to the conduits 51 into the discharge manifold 53 thence through the conduit 86 back to the experimental digester 85, flow direction being indicated by an arrow 87. Cooking of the particles in each cannister thus proceeds at the same rate and at the same temperature, rate and temperature being essentially as in the digester 85. When processing has continued for a particular length of time, means selectively to isolate a particular cannister permit anyone cannister to be isolated by its associated valves 27 and 52, see FIG. 2, closing of which effects isolation. Its drain valve 31 can then be opened and the pulp or other material in the selected cannister washed with cold water by opening the associated valve 64. The cover of the selected cannister can then be quickly opened and the pulp contents examined.

It is evident that, since the wood particles in the experimental digester 85 and in the cannisters are pulped, or cooked, or processed, under closely similar temperature conditions, then accurate determination, in point of time, of the digestive state of pulp in the experimental digester 85 readily is attainable. That is to say chemical reaction or pulping or digestion or processing of the material in any cannister can be stopped within one or two seconds at any time during a cooking or processing cycle.

Furthermore, operating personnel are subjected only minimally to gaseous or toxic fumes, as the relatively small content of each cannister to be tested is washed prior to removal of its cover. As well the operation of isolating a cannister are is accomplished by turning simple valves, as are cooling and washing.

The apparatus 10 can be used to simulate conditions under which present pulping research is carried out, and these conditons are essentially reproduced in each cannister unit of the assembly.

The first mode of operation of the apparatus of the invention can be used in control of production pulping. Mill-run chips are placed in the cannisters, as previously described, and digestive liquor from the production digester pumped as explained through the assembly. The condition of the pulp in the production digester can be determined at any time by examining the contents of a cannister. This exemplification can be utilized to determine optimum cooking under mill conditions.

SECOND MODE

In the second mode of operation samples of wood chips from the body of chips, together with digestive liquor, can be placed in a bomb 88 which fits loosely inside the cannister 36, and a heated cooking fluid such as, pulping liquor from a laboratory or mill digester, steam from a process lines, oil, glycerine, ethylene glycol, silicone, or water, is pumped through the circulation conduit 11 and through the cannisters as hereinbefore described. Any selected cannister can be isolated, as explained, at a given time, and the bomb therein cooled by flushing with cold water.

EXAMPLES

Known bomb procedures give results of yield — typically about 45 percent — reproducable within a range of plus or minus about one percentage point. Assuming no or negligible error of analysis, this range of reproducibility results from parameter variations. Examples show reproducibility attained by methods of the present invention expressed in the instant apparatus.

EXAMPLE I

USE OF THE APPARATUS IN THE FIRST MODE

Triplicate samples of a body of green screened chips of *Tsuga Heterophylla* were placed in three cannisters of a six-unit assembly according to the invention, and connected to a circulating system of a laboratory digester of 30-liters capacity. Cooking liquor from the laboratory digester was circulated through the three cannisters for the full course of a conventional kraft cook:

| | |
|---|---|
| Effective Alkali | 17.5 percent |
| Maximum Temperature | 172° C |
| Time to Max. Temp | 135 minutes |
| Time at Max. Temp | 75 minutes |
| Liquor to Wood Ratio | 4.8 to 1 |
| Sulphidity | 25 percent |

The yield of pulp, corrected to 20 permanganate number from the samples in each cannister was; 45.8, 45.4, and 45.7 percent respectively.

EXAMPLE II

In a similar experiment, 3 cannisters were filled with *Tsuga Heterophylla* chips which had been dried to constant and known weight. Conditions in the laboratory digester were:

| | |
|---|---|
| Effective Alkali | 22.5 percent |
| Maximum Temperature | 173° C |
| Time to Max. Temp | 135 minutes |
| Time at Max. Temp | 75 minutes |
| Liquor to Wood Ratio | 4.8 to 1 |
| Sulphidity | 25 percent |

The yield of pulp from the wood in each cannister unit was; 42.3, 42.4, and 42.6 percent respectively.

EXAMPLE III

USE OF THE APPARATUS WITH BOMBS INSERTED

In experiments otherwise similar to those above, green *Tsuga Heterophylla* chips were placed in three bombs, one bomb being inserted into each of three cannisters of a six cannister assembly. Conditions in the main laboratory digester were:

| | |
|---|---|
| Effective Alkali | 17.5 percent |
| Maximum Temperature | 171° C |
| Time to Max. Temp | 130 minutes |
| Time at Maximum Temp | 75 minutes |
| Liquor to Wood Ratio | 5 to 1 |
| Sulphidity | 25 percent |

The yield of pulp from each of the bombs was; 45.4, 45.1, and 45.2 percent respectively.

EXAMPLE IV

In a generally similar experiment, three bombs were filled with oven-dried *Tsuga Heterophylla* chips of known weight; a bomb was placed in each of three cannisters, and the liquor from the main laboratory digester circulated for the full course of a conventional kraft cook:

| | |
|---|---|
| Effective Alkali | 17.5 percent |
| Maximum Temperature | 172° C |
| Time to Max. Temp | 135 minutes |
| Time at Max. Temp | 75 minutes |
| Liquor to Wood Ratio | 4.8 to 1 |
| Sulphidity | 25 percent |

The yield of pulp from the wood in the bombs placed in each of the cannisters was; 43.3; 43.2, and 43.4 percent respectively.

This is approximately one order of magnitude more nearly precise than obtained in prior art pulping equipment known to the present inventors.

Since all parameters above except sampling error were controlled, it is reasonable to attribute the improvement in reproducibility to control of these parameters.

INHERENT PRECISION

In these tests, all parameters above except material, i.e. sample variation, were held constant within the limits stated. Based upon these data, standard deviation is 0.14 percentage points. This deviation results from, variation between the samples in each container, inherent error precision in the method as expressed in the instant apparatus, and from parameters neglected.

Further tests were made in which the samples were *Tsuga Heterophylla* from selected logs, hand cut to precisely dimensioned chips, dried to constant moisture content in a controlled humidity room, the moisture content being determined by laboratory procedure. Discrepancy due to sampling error, i.e. resulting from variation between individual samples, was thus rendered minimal.

These tests showed deviation in excess of one order of magnitude lower than before. Hence variation due to inherent accuracy of the method and apparatus, and from any other parameters not taken into consideration, can be neglected — that is the method and apparatus are precise within limits closer than are material.

FURTHER CONTEMPLATED USES

The invention has been described and illustrated with particular reference to wood pulp digesters. Other particulate materials, e.g. straw, reeds, bagasse, can be processed in a generally similar manner, i.e. with a cooking liquor. The present invention can be used for research and production control relative to processing these materials.

In brewing, in certain aspects of the food industry, and in other manufactures, sampling and production control can be effected with apparatus and method according to the present invention.

We claim:
1. Apparatus for pulping samples of particulate material including:
   a. means for containing a source of liquid heated to a particular temperature,
   b. a cylindrical intake manifold having an axial conduit connection from the source of liquid for receiving liquid pumped from said source,
   c. a plurality of cylindrical cannisters disposed concentrically around the intake manifold for receiving samples of particulate material and having removable cover plates at upper ends, each cannister having an axial intake port at a lower end and a discharge port at an upper end,
   d. radial intake conduits extending from and connecting the intake manifold to the intake ports of each cannister,
   e. a cylindrical discharge manifold disposed centrally of the cannisters,
   f. radial discharge conduits extending between and connecting the discharge port of each cannister and the discharge manifold so that flow of liquid through each cannister is substantially the same and at a temperature essentially that of the source of liquid,
   g. manually operable valves disposed in each of said intake and discharge conduits operable selectively to isolate any of the cannisters.
2. Apparatus as claimed in claim 1 including means to cool and flush a selected cannister.

* * * * *